US010710858B2

(12) United States Patent
Rechberg et al.

(10) Patent No.: US 10,710,858 B2
(45) Date of Patent: Jul. 14, 2020

(54) EXTRACTOR FOR BEVERAGE BASKETS

(71) Applicant: Actron Manufacturing, Inc., Corona, CA (US)

(72) Inventors: Frank H. Rechberg, Corona, CA (US); Jason A. Rechberg, Corona, CA (US)

(73) Assignee: Actron Manufacturing, Inc., Corona, CA (US)

( * ) Notice: Subject to any disclaimer, the term of this patent is extended or adjusted under 35 U.S.C. 154(b) by 0 days.

(21) Appl. No.: 16/450,291

(22) Filed: Jun. 24, 2019

(65) Prior Publication Data

US 2020/0079633 A1 Mar. 12, 2020

Related U.S. Application Data

(63) Continuation of application No. 16/128,822, filed on Sep. 12, 2018, now abandoned.

(51) Int. Cl.
*B66F 19/00* (2006.01)
*B64D 9/00* (2006.01)
*B64D 11/04* (2006.01)

(52) U.S. Cl.
CPC ............... *B66F 19/00* (2013.01); *B64D 9/00* (2013.01); *B64D 11/04* (2013.01)

(58) Field of Classification Search
CPC .......... A47F 1/125; A47F 1/126; A47F 13/06; B25J 1/04; B25J 1/08; B25J 1/10; B64D 9/00; B64D 11/007; B64D 11/04; B66F 19/00
USPC .................................. 294/15, 175, 209, 210
See application file for complete search history.

(56) References Cited

U.S. PATENT DOCUMENTS

| | | | | |
|---|---|---|---|---|
| 6,375,015 | B1 * | 4/2002 | Wingate | A47F 1/126 211/175 |
| 6,527,127 | B2 * | 3/2003 | Dumontet | A47F 1/125 211/184 |
| 7,673,912 | B2 * | 3/2010 | Breininger | B25B 9/00 294/210 |
| 9,445,675 | B1 * | 9/2016 | DeSena | A47F 1/126 |
| 9,821,911 | B2 * | 11/2017 | Wallbott | B64D 11/0007 |
| 2009/0101606 | A1 * | 4/2009 | Olson | A47F 5/005 211/59.3 |
| 2016/0150894 | A1 * | 6/2016 | Howard | A47F 1/126 211/59.3 |

OTHER PUBLICATIONS

Actron Manufacturing, Inc., photograph of extractor arm, Sep. 11, 2017, 1 page.

* cited by examiner

*Primary Examiner* — Dean J Kramer
(74) *Attorney, Agent, or Firm* — Stetina Brunda Garred and Brucker

(57) ABSTRACT

Disclosed is an extractor for an airplane galley storage container. The extractor may include a rigid frame with a grip on a first end portion connected to an extractor arm on an opposite, second end portion of the rigid frame. When the grip is pulled, the extractor arm moves correspondingly proximally from its position on the opposite end of the rigid frame. When the grip is released, at least one constant force spring, stored in a spring housing on or near a distal end of a rigid frame of the extractor, biases the extractor arm and grip distally to a rest position.

16 Claims, 5 Drawing Sheets

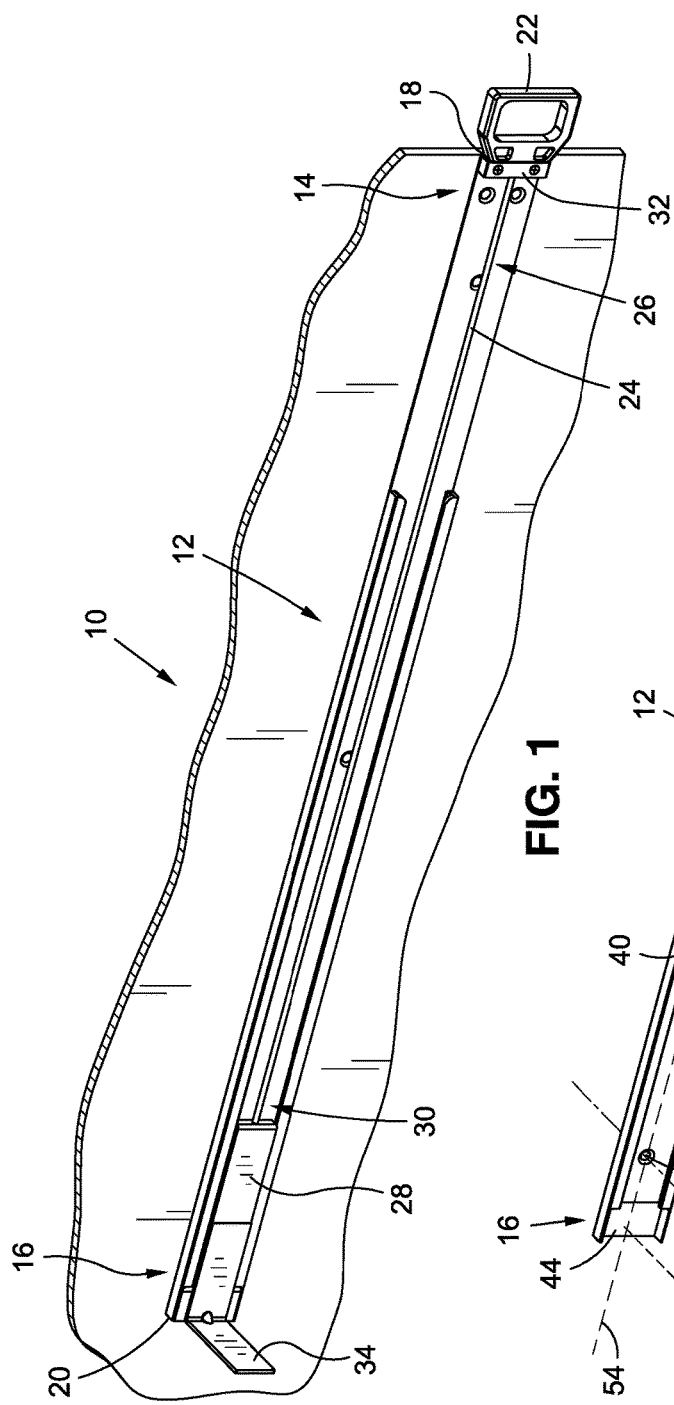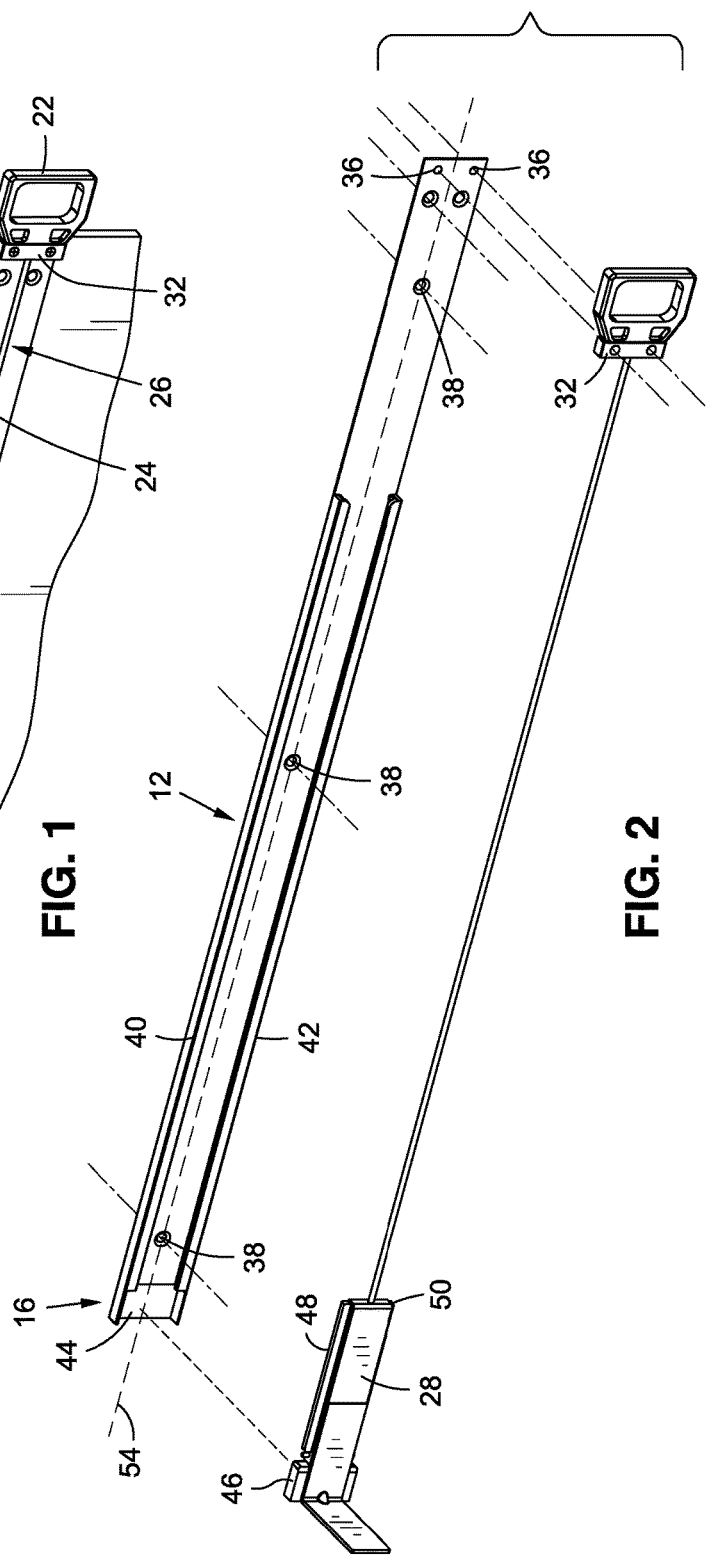

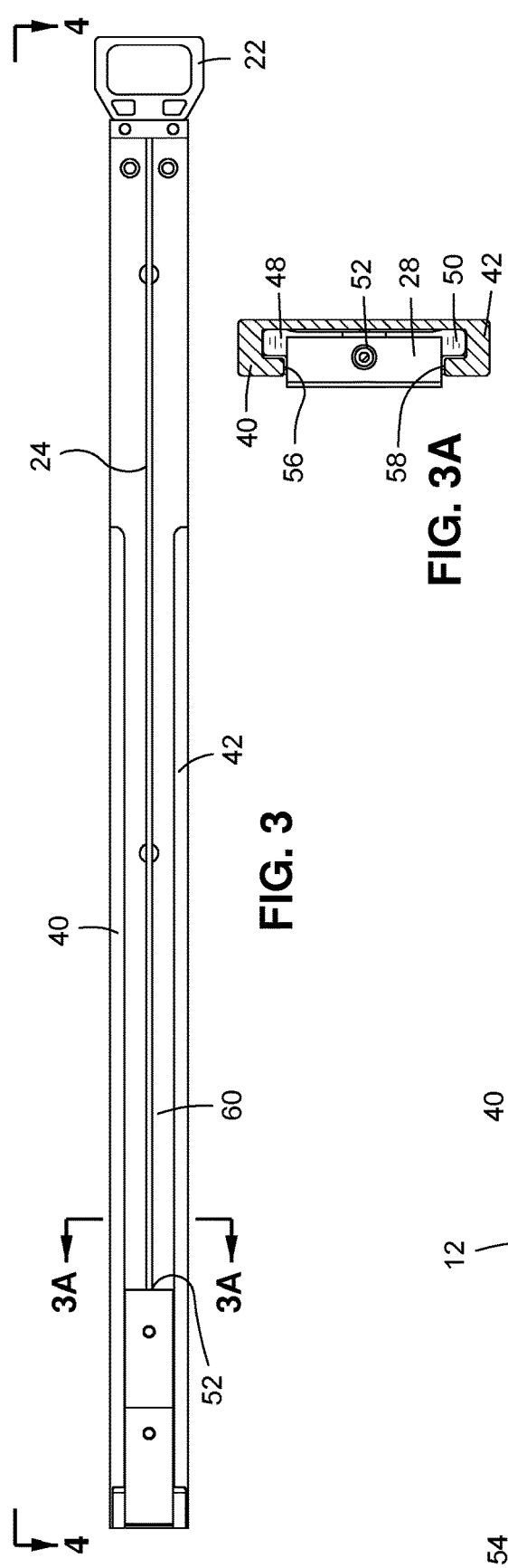
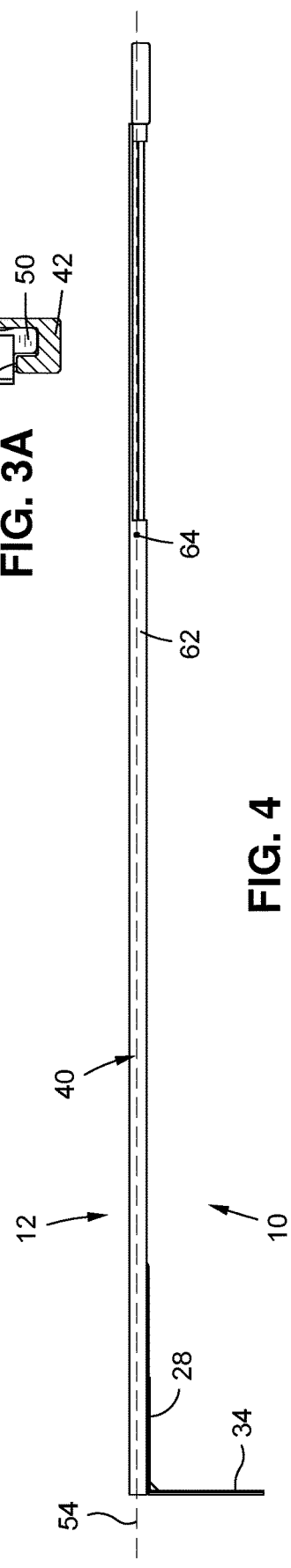
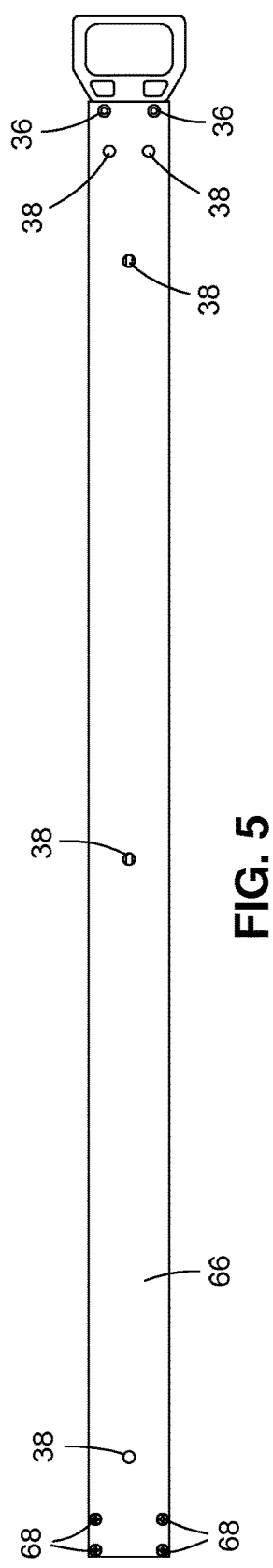

EXTRACTOR FOR BEVERAGE BASKETS

CROSS-REFERENCE TO RELATED APPLICATIONS

The present application is a continuation patent application of U.S. patent application Ser. No. 16/128,822 filed on Sep. 12, 2018, the entire contents of which are incorporated herein by reference.

STATEMENT RE: FEDERALLY SPONSORED RESEARCH/DEVELOPMENT

Not Applicable

BACKGROUND

Commercial aircraft are equipped with a galley which the crew uses to store beverages and food items during take-off and during flight. The crew of the aircraft, at a designated point during the flight, then retrieves the beverages and food items from the galley, and places them in a cart which they take down the aisle for serving to passengers on the commercial aircraft.

Some of the storage areas in the galley are above shoulder or head height of many of the aircraft's crew. In addition, the storage areas are made to accommodate more than one storage container. The containers may be arranged one behind the other throughout the depth of the storage area.

Some crew members may not be able to reach storage areas higher in the cabin or the storage containers deep in lower storage areas. Crew members need to access the entirety of each storage area in order to be completely effective.

State of the art extractors use various springs and spring configurations. Such configurations are able to withstand 4000 to 5000 cycles, and then need to be replaced so that the extractor does not lose its bias and remain in an extended or partially extended position. The extractor in such a position presents a hazard to the air crew in addition to providing less than optimal operation.

BRIEF SUMMARY

An extractor allows storage containers, which may be stored more than one deep in a storage area of an airplane galley, to the pulled forward to a proximal opening in the storage area where they may be more easily taken out by an airplane crewmember. The extractor may include a rigid frame with a grip on a first end portion connected to an extractor arm mounted to an extractor arm carrier on an opposite, second end portion of the rigid frame. When the grip is pulled by the crewmember, it moves the extractor arm through a cable connection to the extractor arm carrier. When the grip is pulled proximally toward the crewmember, the extractor arm moves correspondingly proximally from its position on the opposite end of the rigid frame. The extractor arm next contacts a rearmost storage container in the storage area, and moves the rearmost container, and any in front of it, toward the opening in the storage area. When the grip is released, at least one constant force spring, stored in a spring housing on or near a distal end of a rigid frame of the extractor, biases the extractor arm and grip distally to a rest position. Such a constant force spring is able to withstand tens of thousands of such cycles of proximal and distal movement.

Disclosed is an extractor for extracting storage containers from an aircraft galley storage area. The extractor may include a rigid frame having a first end portion and a second end portion. The extractor may further include a grip extending from the first end portion, a cable having a first cable end and a second cable end, the cable attached to the grip on the first cable end, and an extractor arm carrier attached to the second cable end. An extractor arm may be attached to the extractor arm carrier. Further, a first spring may be attached to the extractor arm carrier, and a second spring may be attached to the extractor arm carrier. Finally, a spring housing may be located on the second end portion of the rigid frame. The first spring and the second spring may abut one another in the spring housing, so that a free end portion of the first spring and a free end portion of the second spring abut one another as the free end portion of the first spring and the free end portion of the second spring extend from the spring housing.

Further disclosed is an extractor for bringing storage containers from deeper in an airplane galley to the front of the galley. The extractor may include a rigid frame. The rigid frame may have a first end portion and a second end portion. The extractor may also include a spring housing attached to the second end portion of the rigid frame, and at least one spring may be placed in the spring housing, the at least one spring being a constant force spring, the portion of the spring in the housing may be in a flat coiled configuration, the portion of the at least one spring exterior of the spring housing including a free end. The extractor may also include an extractor arm attached to the free end of the at least one spring, and a grip attached to the extractor arm and located on the first end portion of the rigid frame.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1 is a perspective view of the extractor;
FIG. 2 is a perspective exploded view of the extractor;
FIG. 3 is a side plan view of the extractor;
FIG. 3*a* is a sectional view taken along line 3A-3A in FIG. 3;
FIG. 4 is a top plan view of the extractor;
FIG. 5 is a side plan view of the opposite side of the extractor shown in FIG. 5.

DETAILED DESCRIPTION

Figure 6:
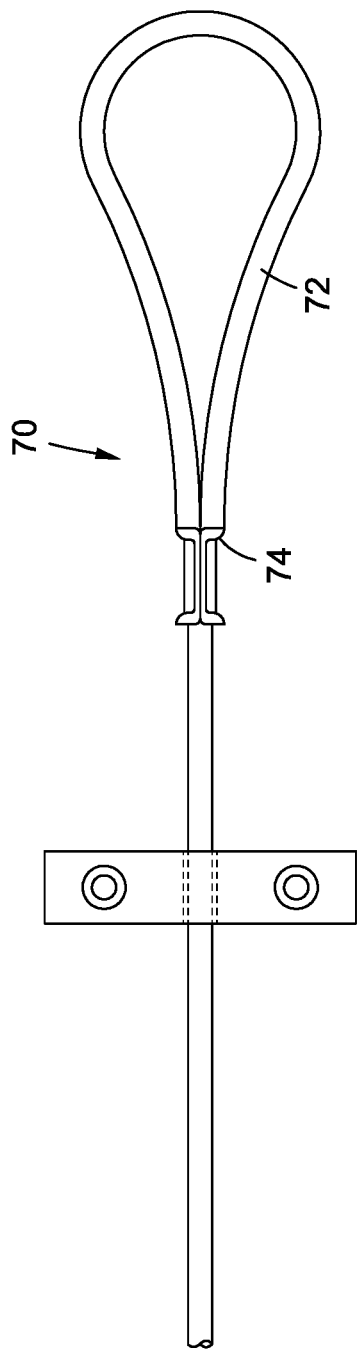
FIG. 6 is a side view of an alternate grip for the extractor.

The detailed description set forth below in connection with the appended drawings is intended as a description of the presently preferred embodiment of an extractor for airplane galley storage containers, and is not intended to represent the only form in which it can be developed or utilized. The description sets forth the functions for developing and operating the adapter in connection with the illustrated embodiments. It is to be understood, however, that the same or equivalent functions may be accomplished by different embodiments that are also intended to be encompassed within the scope of the present disclosure. It is further understood that the use of relational terms such as first, second, distal, proximal, and the like are used solely to distinguish one from another entity without necessarily requiring or implying any actual such relationship or order between such entities.

Disclosed herein is an extractor for an airplane galley. The extractor allows storage containers, which may be stored more than one deep in a storage area of the airplane galley, to be pulled forward to a proximal opening in the storage area where they may be more easily taken out by an airplane crewmember. The extractor may include a rigid frame with a grip on a first end portion connected to an extractor arm on an opposite, second end portion of the rigid frame. The grip controls, at least in part, the positioning of the extractor arm. When the grip is pulled proximally toward the crewmember, the extractor arm moves correspondingly proximally from its position on the opposite end of the rigid frame. The extractor arm contacts a rearmost storage container in the storage area, and pushes the rearmost container, and any in front of it, toward the opening in the storage area. When the grip is released, at least one constant force spring, stored in a spring housing on or near a distal end of a rigid frame of the extractor, biases the extractor arm and grip distally to a rest position. Such a constant force spring is able to withstand tens of thousands of such cycles of proximal and distal movement.

An extractor 10 is shown in FIG. 1. The extractor 10 includes a rigid frame 12. The rigid frame 12 includes a first end portion 14 and a second end portion 16 which define a proximal end 18 and a distal end 20. The extractor further includes a grip 22, a cable 24 which attaches to the grip 22 on a first end 26, and which further attaches to an extractor arm carrier 28 on a second end 30. The extractor 10 may further include a grip stop 32 against which the grip 22 rests, and an extractor arm 34, which is attached to the extractor arm carrier 28.

In FIG. 2, the rigid frame 12 is shown disconnected from all the other parts. On a first end portion 12, the rigid frame 12 includes holes 36 for attaching the grip stop 32. The rigid frame 12 further includes holes 38 for attaching the rigid frame 12 to a surface using mechanical fasteners (not shown). The rigid frame 12 further includes a first longitudinal side channel 40, and an opposing second longitudinal side channel 42. On the second end portion 16, the rigid frame 12 includes a receiving cavity 44 for a spring housing 46. The receiving cavity 44 may have a low friction plate (not shown) placed across it to prevent moving components from binding up when the moving components are placed therein, as discussed in greater detail below. The extractor arm carrier 28 includes a first running rail 48, which as can be seen in a combination of FIGS. 1 and 2, travels in the first longitudinal side channel 40, and a second running rail 50, which, travels in the second longitudinal side channel 42.

As shown in FIG. 3, the cable 24 runs from a cable attachment point 52 on the extractor arm carrier 28 in a straight line to the grip 22. The path of the cable 24 parallels a longitudinal axis 54 (FIG. 2) of the rigid frame 12. The cable 24 is further substantially centered between the first longitudinal side channel 40 and the second longitudinal side channel 42.

FIG. 3a shows a transverse cross section of the extractor 10 taken at line 3a-3a in FIG. 3. It shows the first running rail 48 in the first longitudinal side channel 40 and the second running rail 50 in the opposing second longitudinal side channel 42. The extraction arm carrier 28 is placed between an inside edge 56 of the first longitudinal side channel 40 and an inside edge 58 of the second longitudinal side channel 42. The cable attachment point 52 can be seen on the proximal end of the extractor arm carrier 28.

FIG. 4 shows the extractor arm 34 extending at substantially a 90 degree angle from the extractor arm carrier 28 and from the longitudinal axis 54 of the rigid frame 12. As shown in FIGS. 3 and 4, the first longitudinal side channel 40 and the second longitudinal side channel 42 do not extend an entire length of the rigid frame 12. This configuration allows the shortened longitudinal channels 40, 42 to serve as food drop slots. In this configuration, when the extractor arm carrier 28 moves to the proximal end of a longitudinal slot 60 of a rigid frame, as described in further detail below, the extractor arm carrier 28 can knock any food particles trapped in the rigid frame 12 out the end of the slot. Alternatively, to add rigidity to the rigid frame 12, the first longitudinal side channel 40 and the second longitudinal side channel 42 may extend the entire length of the rigid frame 12. In this configuration, one or more transverse slots may be formed in the lower longitudinal side channel (42 as shown) in order to allow trapped food particles to fall though in a similar manner.

Inserted through a side wall 62 of the first longitudinal side channel 40 is a first stop 64. This may be the only stop in the extractor 10. Alternatively, the extractor 10 may have a second stop (not shown) in the second longitudinal side channel 42. The second stop may be located directly across the longitudinal axis 54 of the rigid frame 12 from the first stop 64. As yet another alternative, the extractor 10 may include only a single stop 64 in the second longitudinal side channel 42.

As shown in FIG. 5, a back 66 of the rigid frame 12 includes holes 36 for attaching components and holes 38 for attaching the extractor to a surface. Mechanical fasteners 68 on the second end portion 16 attach the spring housing 46 to the rigid frame 12. Other mechanical fasteners 68 attach the grip stop 32 to the rigid frame 12. The mechanical fasteners 68 may be machine screws, bolts, nut and bolt combinations, rivets, or any other mechanical fastener suitable for holding the two components together.

Figure 7:
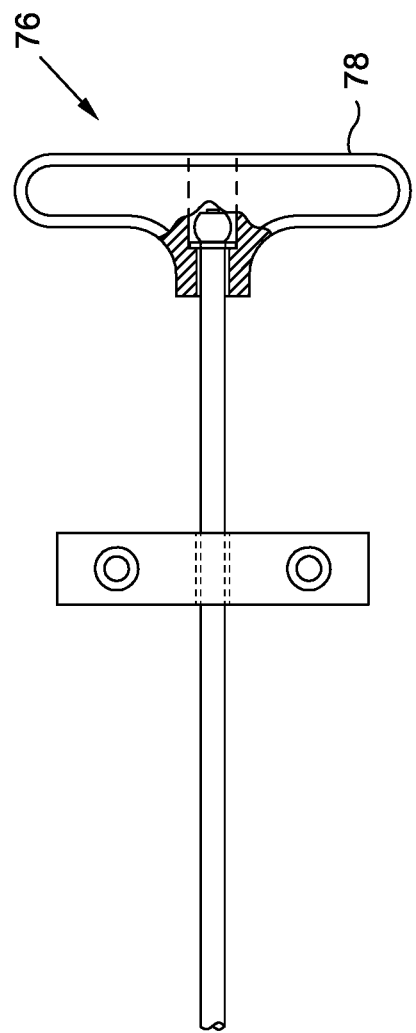
FIG. 7 is a side view of another alternate grip for the extractor.

FIGS. 6 and 7 show alternate configurations to the grip 22. FIG. 6 shows a flexible grip 70. The flexible grip 70 may be formed by creating a loop 72 in the cable 24 and then crimping a free end of the loop 72 back on to the cable 24. The crimping may be done using a crimping fastener 74, as is shown in FIG. 6, or may be attached by melting the cable 24 back on to itself, or by using an adhesive to attached the cable 24 back on to itself. Alternatively, a separate loop of material may be attached to the cable.

A second alternative grip 76 is shown in FIG. 7. The grip shown in FIG. 7 is an alternative rigid grip 76. The configuration of a grip frame 78 is different than that shown in FIGS. 1-5. The grip frame 78 shown in FIG. 7 has a lower profile than the grip 22 of FIGS. 1-5. That is, when in the retracted position, which is described in detail below, the rigid grip 78 protrudes less from a face of the galley. The extra clearance provided by the low profile makes it easier for the air crew to operate in the galley area or when walking by the galley. However, because of the reduced depth of the grip frame 78, the rigid grip 76 may be harder for a user to grasp, and may increase the time a user must take to get positive control of the rigid grip 76. The decision about which embodiment of grip 22, 70, 76 to use on any extractor 10 may likely depend on the type of aircraft in which the extractor 10 is being installed. Each of the different types of aircraft may have differing traffic patterns and therefore different requirements for the galley which may drive the choice of which grip 22, 70, 76 to use.

Figure 8:
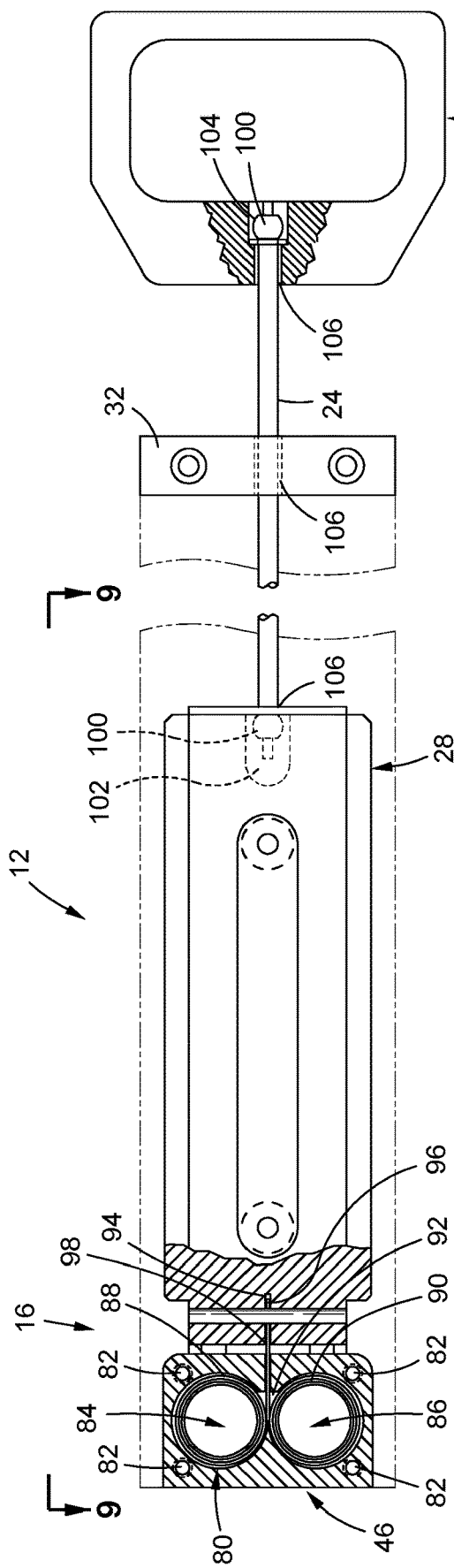
FIG. 8 is a partial cross sectional view of a portion of the extractor including the spring cartridge.

The spring housing 46 is shown in detail in FIG. 8. The spring housing 46 is placed on the second end portion 16 of the rigid frame 12, and specifically in the receiving cavity 44. The spring housing 46 may include an open side which allows direct access to an interior 80 of the spring housing 46. This open side may be placed against the low friction plate. In this way, the low friction plate is sandwiched between the spring housing 46 and the rigid frame 12. As discussed above, the spring housing 46 may be attached to the rigid frame 12 using mechanical fasteners 68. Thus, as shown in FIG. 8, the spring housing 46 may include threaded apertures 82 for attaching the mechanical fasteners 68. The low friction plate may have holes corresponding to the threaded apertures 82 through which the mechanical fasteners 68 pass. When the spring housing 46 and rigid frame 12 are assembled, the mechanical fasteners 68 also hold the low friction plate in place, preventing any shifting, which would cause loss of effectiveness of the low friction plate.

The spring housing 46 may include two internal chambers 84, 86. The two internal chambers 84, 86 may be treated with a material across their surface which reduces friction. A first spring 88 may be placed in a first chamber 84, and a second spring 90 may be placed in a second chamber 86. The first spring 88 and the second spring 90 may be flat wire constant force springs. That is, the wire may have a rectangular transverse cross section with a greater width than height. The material used in the spring may, for example, have a thickness in the range of 0.0001 to 0.01 inches, with 0.001 to 0.007 being more preferred and 0.005 and 0.0057 inches being most preferred, and a width of 0.1 to 1 inch, with 0.15 to 0.5 inches being more preferred, and 0.20 to 0.27 inches being most preferred. As just one example, in a most preferred embodiment, the spring may have a thickness of 0.0055 inches and a width of 0.25 inches. As shown in FIG. 8, the wire may be coiled so that it forms a rolled ribbon of spring steel such that the spring is in a rolled-up form when relaxed, but may be both further compressed and extended. When further compressed, the spring becomes even tighter, and an outermost wrap of the spring coil defining a shorter circumference. When a tensile force is applied to a free end of the constant force spring and the free end set in motion, the wrapped ribbon unwraps with a substantially constant force. In one embodiment, the spring may have a length in the range of 10 to 30 inches, with 15 to 25 inches being more preferred, and with 19 to 21 inches being most preferred, and may be coiled with an outer diameter in the range of 0.1 to 2 inches, with a range of 0.3 to 1 inch being more preferred, and 0.65 to 0.75 inches being most preferred. As just one example, in a most preferred embodiment, the spring may have a length of 20 inches and an outer diameter of 0.70 inches.

As can further be seen in FIG. 8, the first chamber 84 and second chamber 86 may share a common aperture 92. When the first spring 88 is placed in the first chamber 84, and the second spring 90 is placed in the second chamber 86 the first spring 88 and second spring 90 abut one another through the common aperture 92. Specifically, a portion of the outermost wrap of the first spring 88 and a free end portion 96 of the second spring 90 abut one another in the common aperture 92. The portion of the outermost wrap of the first spring 88 and the second spring 90 which abut changes as the first spring 88 and second spring 90 extend and retract. The free end portion 94 of the first spring 88 and the free end portion 96 of the second spring 90 extend external to the spring housing 46 through a free end slot 98 when the first spring 88 and second spring 90 are in the retracted position. The free end portion 94 of the first spring 88 and the free end portion 96 of the second spring 90 then attach to the extractor arm carrier 28. By extending the free end portion 94 of the first spring 88 and the free end portion 96 of the second spring 90 and attaching both free end portions 94, 96 to the extractor arm carrier 28, a pre-tensioning of the first spring 88 and second spring 90 occurs. This allows the first spring 88 and the second spring 90 to have a substantially constant force over the length of travel, which is described in further detail below.

Alternatively, a spring placed in any chamber may be placed on a spindle to reduce friction as the spring uncoils. The spindle may further provide additional biasing force through the spindle mechanism.

Also alternatively, the spring housing may include a single chamber in which a single spring is located. The extractor may operate using just the single spring. Even with a single constant force spring, the device would be constructed substantially as described above, with exceptions for the single chamber containing the single spring in the spring housing. The device would also operate substantially as described below, with the exception of the single spring providing the biasing force toward the distal end 20 of the rigid frame 12.

Although other types of springs could be used, the use of a constant force spring offers distinct advantages over other springs. The constant force springs are significantly more durable than other springs. The constant force springs include a usable life of 20,000 to 25,000 cycles. The greatly reduces required maintenance and thus reduces the cost of ownership over the lifetime of the extractor 10.

As is further shown in FIG. 8, the cable 24 may be attached to both the grip 22 and the extractor arm carrier 28 by attaching ball ends 100 to the cable 24 and placing the ball ends 100 in an extractor arm carrier cable cavity 102 and a grip cable cavity 104. Each of the extractor arm carrier cable cavity 102 and the grip cable cavity 104 include apertures 106 which are sized to prevent the respective ball ends 100 from passing through. The contact between the ball ends 100 and the material around the respective apertures 106 transfers force applied to the grip 22 to the cable 24 and ultimately to the extractor arm carrier 28 as discussed in greater detail below.

The grip stop 32 includes a cable aperture 106 which allows the cable 24 to pass through. However, the aperture 106 will not allow the grip 22, to pass through, and thus stops the grip 22, and the bias of the first spring 88 and the second spring 90 create a friction between the grip 22, and the grip stop 32 which holds the grip 22 in place in a resting position, which is described in further detail below. It is understood that the above also applies to the flexible grip 70 and the alternate rigid grip 76 in addition to the grip 22.

Figure 9:
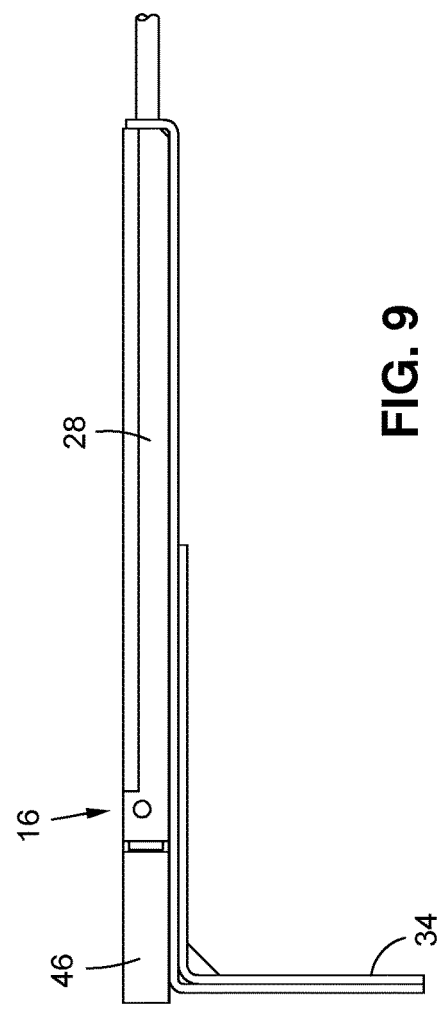
FIG. 9 is a top plain view of the portion of the extractor taken along line 9-9 in FIG. 8.

As shown in FIG. 9, the extractor arm 34 extends over the extractor arm carrier 28, and thus protrudes from the longitudinal slot 60 of the rigid frame 12. The extractor arm 34 may include two layers of material for additional rigidity. As is further shown in FIG. 9, the extractor arm 34 may extend from the extractor arm carrier 28 toward the second end portion 16 of the rigid frame 12. Because of this, the extractor arm 34 may extend over, but not be attached to, the spring housing 46. This allows the extractor arm 34 to be substantially even with the distal end 20 of the rigid frame 12 when the extractor 10 is in a rest position as described in further detail below.

Figure 10:
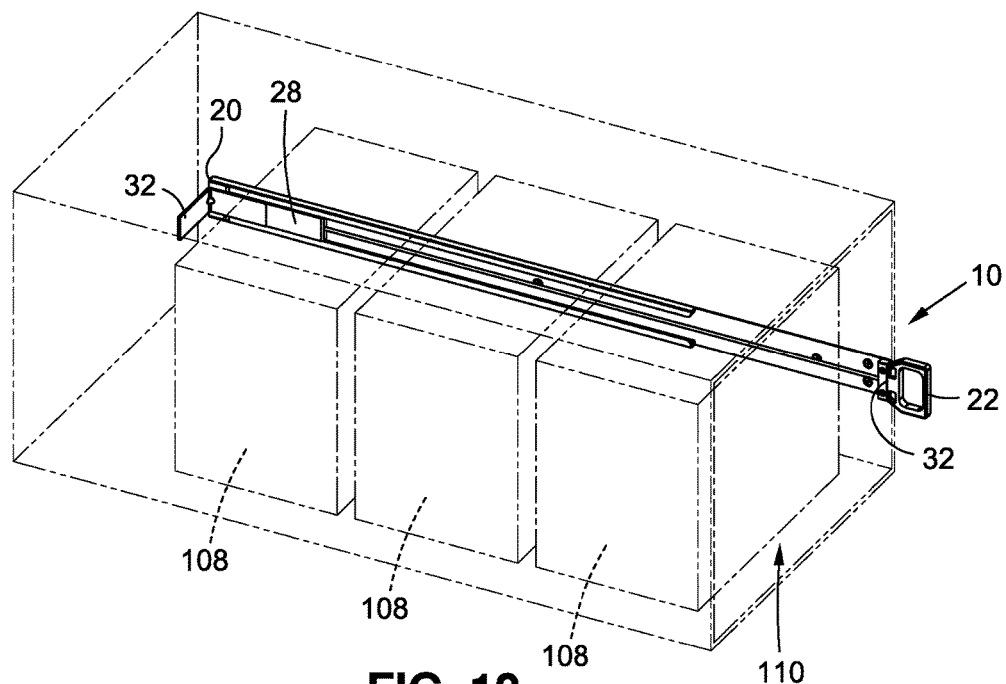
FIG. 10 is a perspective view of the extractor attached to a storage area, and in a retracted position.
Figure 11:
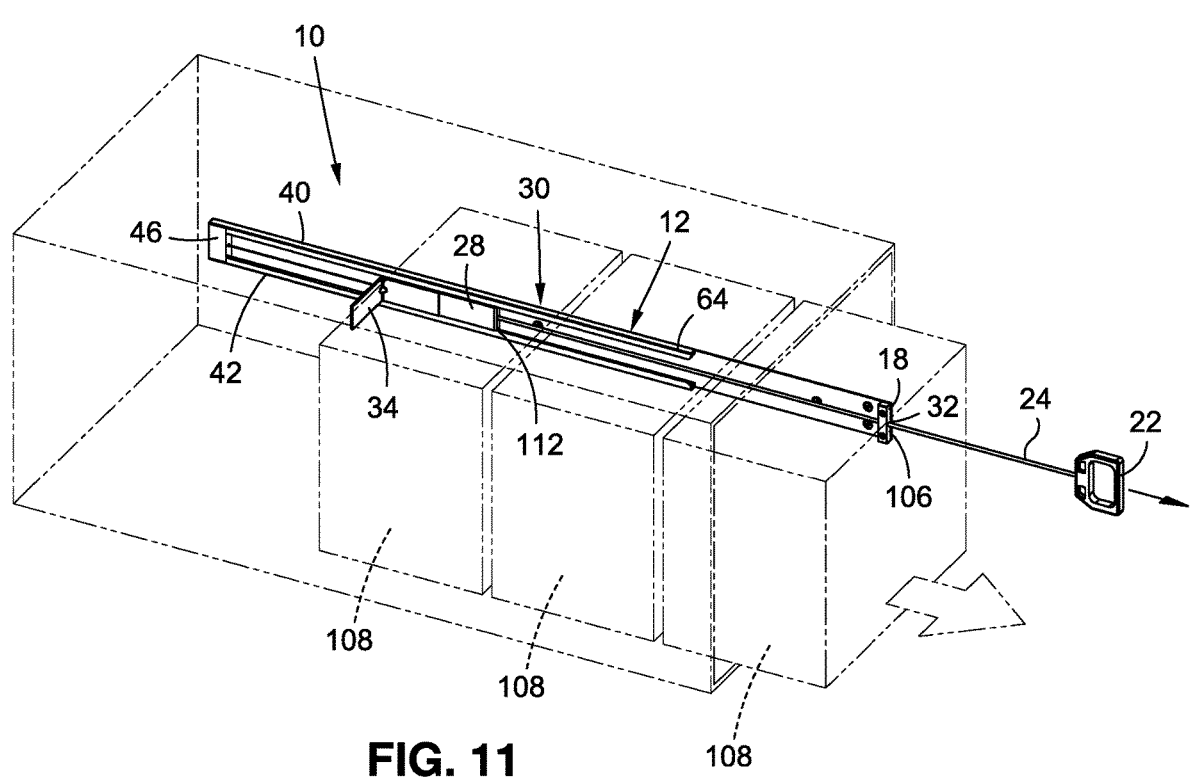
FIG. 11 is a perspective view of the extractor attached to a storage area with the extractor in a partially extended position.

In operation, as shown in FIGS. 10 and 11, the extractor 10 may move from a first, or retracted position, to a second, or extended position. The distance of this movement defines a length of travel. In the retracted position, the first spring 88 and the second spring 90 have biased the extractor arm carrier 28, and thus the extractor arm 34, to the distal end 20 of the rigid frame 12. The grip 22 rests against the grip stop 32, preventing the grip 22 from traveling and further distally. As is further shown in FIG. 10, the extractor 10 is shaped to allow three standard sized airplane galley storage containers 108 to fit between a proximal opening 110 in the galley and the extractor arm 34.

A user may apply a force, shown by the small arrow in FIG. 11, to the extractor 10 by gripping the grip 22 and pulling the grip 22 away from the grip stop 32. In turn, the cable 24 is pulled through the cable aperture 106 in the grip stop 32. Because the cable 24 is attached on a second end 30 to the extractor arm carrier 28, the extractor arm carrier 28 moves toward a proximal end 18 of the rigid frame 12, with the running rails 48, 50 traveling inside the first longitudinal side channel 40 and the second longitudinal side channel 42. Because the extractor arm 34 is attached to the extractor arm carrier 28, the extractor arm 34 is driven in to the back of the rearmost storage container 108, and the extractor arm 34 drives the rearmost storage container 108 forward in correspondence with the movement of the extractor arm carrier 28, as shown by the larger arrow in FIG. 11. Simultaneously, the first spring 88 and the second spring 90 are being extended from the spring housing 46 because the free end portion 94, 96 of both the first spring 88 and the second spring 90 are attached to the extractor arm carrier 28. The spring force of the combination of the first spring 88 and the second spring 90 does not change during the travel of the extractor arm carrier 28 and the extractor arm 34. The user may continue to apply force to the grip 22 until a proximal end 112 of the extractor arm carrier 34 comes in to contact with the at least one stop 64, which prevents the extractor arm carrier 28 from moving any further proximally. The at least one stop 64 is located so that the extractor arm 28 pulls the rearmost container 108 out of the proximal opening 110 of the galley, so that the user can grasp the storage container 108 without having to reach in to the galley.

When the user stops providing force to the grip 22, the bias of the first spring 88 and the second spring 90 returns the extractor arm carrier 28, and thus the extractor arm 34 itself to the retracted position.

The above description is given by way of example, and not limitation. Given the above disclosure, one skilled in the art could devise variations that are within the scope and spirit of the invention disclosed herein, including various ways of configuring the interior of the spring housing. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An extractor for extracting storage containers from an aircraft galley storage area, the extractor comprising:
   a rigid frame having a first end portion and a second end portion;
   a grip extending from the first end portion;
   a cable having a first cable end and a second cable end, the cable attached to the grip on the first cable end;
   an extractor arm carrier attached to the second cable end;
   an extractor arm attached to the extractor arm carrier;
   a first spring attached to the extractor arm carrier;
   a second spring attached to the extractor arm carrier; and
   a spring housing on the second end portion of the rigid frame;
   wherein the first spring and the second spring abut one another in the spring housing, and the first spring and the second spring abut one another as the first spring and the second spring extend from the spring housing;
   wherein the first spring and second spring are constant force springs and bias the extractor arm carrier toward the second end portion of the rigid frame and wherein the first spring and second spring are flat wire springs having a thickness of 0.005 to 0.0057 inches, a width of 0.200 to 0.270 inches, a length of 19 to 21 inches and a coiled outside diameter of 0.650 to 0.750 inches.

2. The extractor of claim 1, wherein the rigid frame further includes a first longitudinal side channel and an opposing second longitudinal side channel.

3. The extractor of claim 2, wherein the extractor arm carrier includes a first running rail in the first longitudinal side channel, and a second running rail in the second longitudinal side channel.

4. The extractor of claim 3, wherein the rigid frame further includes at least one stop.

5. The extractor of claim 4, including two stops.

6. The extractor of claim 5, wherein a first of the two stops is located in the first longitudinal side channel of the rigid frame, and a second of the two stops is located directly across from the first of the two stops in the second longitudinal side channel, and the first of the two stops and the second of the two stops prevent the extractor arm carrier from moving past the location of the first of the two stops and the second of the two stops.

7. The extractor of claim 1, wherein the rigid frame includes a plurality of mounting holes, the mounting holes configured to accommodate a mechanical fastener.

8. The extractor of claim 1, wherein the grip is rigid.

9. An extractor for bringing storage containers from deeper in an airplane galley to the front of the galley, comprising:
   a rigid frame having a first end portion and a second end portion;
   a grip extending from the first end portion;
   a cable having a first cable end and a second cable end, the cable attached to the grip on the first cable end;
   an extractor arm carrier attached to the second cable end;
   an extractor arm attached to the extractor arm carrier;
   at least one spring attached to the extractor arm carrier wherein the at least one spring is a flat wire spring having a thickness of 0.005 to 0.0057 inches, a width of 0.200 to 0.270 inches, a length of 19 to 21 inches and a coiled outside diameter of 0.650 to 0.750 inches.

10. The extractor of claim 9, wherein, when the grip is pulled with enough force to overcome the bias of the at least one spring, the extractor arm moves from a first position along the rigid frame, to a second position wherein the extractor arm carrier abuts at least one stop connected to the rigid frame.

11. The extractor of claim 9, wherein the rigid frame includes a first side channel located along one side of the rigid frame, the first side channel substantially parallel to a longitudinal axis of the rigid frame, and an opposing second side channel.

12. The extractor of claim 11, wherein the extractor arm carrier includes a first running rail on one side and an opposing second running rail on a second side.

13. The extractor of claim 12, wherein the first running rail is placed in the first side channel, and the second running rail is placed in the second side channel.

14. The extractor of claim 13, further comprising at least one stop located in either of the first side channel or second side channel.

15. The extractor of claim 9, wherein the rigid frame includes mounting holes for mounting the rigid frame to a surface using mechanical fasteners.

16. The extractor of claim 9, wherein the bias of the at least one spring biases the extractor arm toward the second end portion of the rigid frame.

* * * * *